US012664508B2

(12) United States Patent
Bunker et al.

(10) Patent No.: US 12,664,508 B2
(45) Date of Patent: Jun. 23, 2026

(54) AUTOMATION SYSTEM TO TRACK A PARCEL

(71) Applicant: Vivint, Inc., Provo, UT (US)

(72) Inventors: Brandon Bunker, Provo, UT (US);
Rongbin Lanny Lin, Provo, UT (US)

(73) Assignee: Vivint LLC, Provo, UT (US)

( * ) Notice: Subject to any disclaimer, the term of this
patent is extended or adjusted under 35
U.S.C. 154(b) by 0 days.

(21) Appl. No.: 18/804,905

(22) Filed: Aug. 14, 2024

(65) Prior Publication Data

US 2025/0061410 A1    Feb. 20, 2025

Related U.S. Application Data

(60) Provisional application No. 63/519,828, filed on Aug.
15, 2023.

(51) Int. Cl.
G06Q 10/0833 (2023.01)

(52) U.S. Cl.
CPC ................................. G06Q 10/0833 (2013.01)

(58) Field of Classification Search
CPC ................................................. G06Q 10/0833
See application file for complete search history.

(56) References Cited

U.S. PATENT DOCUMENTS

| | | | |
|---|---|---|---|
| 6,654,732 B1 | 11/2003 | Naito et al. | |
| 6,748,343 B2 | 6/2004 | Alexander et al. | |
| 7,193,644 B2 | 3/2007 | Carter | |

| | | | |
|---|---|---|---|
| 7,956,739 B2 | 6/2011 | Hong et al. | |
| 8,139,095 B2 | 3/2012 | Carter | |
| 8,144,183 B2 | 3/2012 | Carter | |
| 8,144,184 B2 | 3/2012 | Carter | |
| 8,154,581 B2 | 4/2012 | Carter | |
| 8,164,614 B2 | 4/2012 | Carter | |
| 9,414,030 B2 | 8/2016 | Carter | |

(Continued)

OTHER PUBLICATIONS

Wang, Z., Liu, D., Sun, Y., Pang, X., Sun, P., Lin, F., Lui, J. C., &
Ren, K. (2022). A survey on IOT-enabled home automation sys-
tems: Attacks and defenses. IEEE Communications Surveys Tuto-
rials, 24(4), 2292-2328. https://doi.org/10.1109/comst.2022.
3201557 (Year: 2022).*

(Continued)

*Primary Examiner* — Shannon S Campbell
*Assistant Examiner* — Manal A. Alsamiri
(74) *Attorney, Agent, or Firm* — Nolte Lackenbach
Siegel; N. Alexander Nolte

(57) ABSTRACT

A computer-implemented method may receive a confirma-
tion message indicating a sensor was purchased from a
third-party retailer and indicating an identity of a user that
purchased the sensor. The method may receive a verification
message requesting authorization to install the sensor within
an environment, the verification message indicating an iden-
tity of a user that is requesting authorization to install the
sensor. The method may compare the identity of the user
indicated in the confirmation message and the identity of the
user indicated in the verification message. The method may,
responsive to the identity of the user in the confirmation
message being the same as the user in the verification
message, automatically authorizing the user for the subscrip-
tion service provided by the third-party retailer.

20 Claims, 7 Drawing Sheets

(56) References Cited

U.S. PATENT DOCUMENTS

| | | | |
|---|---|---|---|
| 9,432,638 B2 | 8/2016 | Carter | |
| 9,485,478 B2 | 11/2016 | Carter | |
| 9,516,284 B2 | 12/2016 | Carter | |
| 9,648,290 B2 | 5/2017 | Carter | |
| 9,653,323 B2 | 5/2017 | Chew | |
| 10,674,120 B2 | 6/2020 | Carter | |
| 10,820,200 B2 * | 10/2020 | Syed | H04W 12/12 |
| 10,986,717 B1 | 4/2021 | Fu et al. | |
| 11,195,398 B1 | 12/2021 | Fu et al. | |
| 11,581,099 B1 | 2/2023 | Rufo et al. | |
| 12,015,498 B1 * | 6/2024 | Lemberger | H04L 12/2807 |
| 2002/0070859 A1 | 6/2002 | Gutta et al. | |
| 2002/0086660 A1 | 7/2002 | Sullivan et al. | |
| 2003/0117280 A1 | 6/2003 | Prehn | |
| 2003/0118216 A1 | 6/2003 | Goldberg | |
| 2005/0176400 A1 | 8/2005 | Mullet et al. | |
| 2005/0281435 A1 | 12/2005 | Aggarwal | |
| 2006/0041500 A1 | 2/2006 | Diana et al. | |
| 2009/0048859 A1 | 2/2009 | McCarthy et al. | |
| 2009/0299825 A1 | 12/2009 | Olawski et al. | |
| 2009/0299854 A1 | 12/2009 | Olawski et al. | |
| 2010/0082174 A1 | 4/2010 | Weaver et al. | |
| 2010/0289643 A1 | 11/2010 | Trundle et al. | |
| 2011/0054973 A1 | 3/2011 | Deich et al. | |
| 2012/0023145 A1 | 1/2012 | Brannon et al. | |
| 2012/0284777 A1 | 11/2012 | Eugenio et al. | |
| 2012/0316690 A1 | 12/2012 | Li et al. | |
| 2014/0015981 A1 | 1/2014 | Dietl | |
| 2014/0266681 A1 | 9/2014 | Small | |
| 2014/0278028 A1 | 9/2014 | Nye et al. | |
| 2014/0282048 A1 | 9/2014 | Shapiro et al. | |
| 2014/0324192 A1 | 10/2014 | Baskaran et al. | |
| 2015/0039105 A1 | 2/2015 | Lee et al. | |
| 2015/0088329 A1 | 3/2015 | Thiruvengada et al. | |
| 2015/0108901 A1 | 4/2015 | Greene et al. | |
| 2015/0228419 A1 | 8/2015 | Fadell et al. | |
| 2016/0142407 A1 | 5/2016 | Chun et al. | |
| 2016/0261425 A1 | 9/2016 | Horton et al. | |
| 2016/0274230 A1 | 9/2016 | Wu et al. | |
| 2016/0350654 A1 | 12/2016 | Lee et al. | |
| 2017/0262706 A1 | 9/2017 | Sun et al. | |
| 2018/0035901 A1 | 2/2018 | Cronin et al. | |
| 2018/0047274 A1 | 2/2018 | Miwa | |
| 2018/0114420 A1 | 4/2018 | Siminoff et al. | |
| 2018/0165933 A1 | 6/2018 | Siminoff | |
| 2018/0189913 A1 | 7/2018 | Knopp et al. | |
| 2018/0234480 A1 * | 8/2018 | Rezvani | G06F 3/04817 |
| 2018/0240454 A1 | 8/2018 | Raj et al. | |
| 2018/0294047 A1 | 10/2018 | Hosseini et al. | |
| 2018/0341835 A1 | 11/2018 | Siminoff | |
| 2019/0087646 A1 | 3/2019 | Goulden et al. | |
| 2019/0108404 A1 | 4/2019 | Xu | |
| 2019/0156601 A1 | 5/2019 | Sinha et al. | |
| 2019/0327448 A1 | 10/2019 | Fu et al. | |
| 2020/0180506 A1 | 6/2020 | Nakayama et al. | |
| 2021/0056184 A1 | 2/2021 | Modani et al. | |
| 2022/0165036 A1 | 5/2022 | Daley et al. | |
| 2022/0272523 A1 * | 8/2022 | Raleigh | H04L 67/34 |

OTHER PUBLICATIONS

Hossain et al., "Adaptive Interaction Support in Ambient-Aware Environments Based on Quality of Context Information" in Multimed tools Appl (2013) 67: pp. 409-432 (Year: 2013).

Unboxing the Ring Video Dorrbell is it Worth it video.

* cited by examiner

300

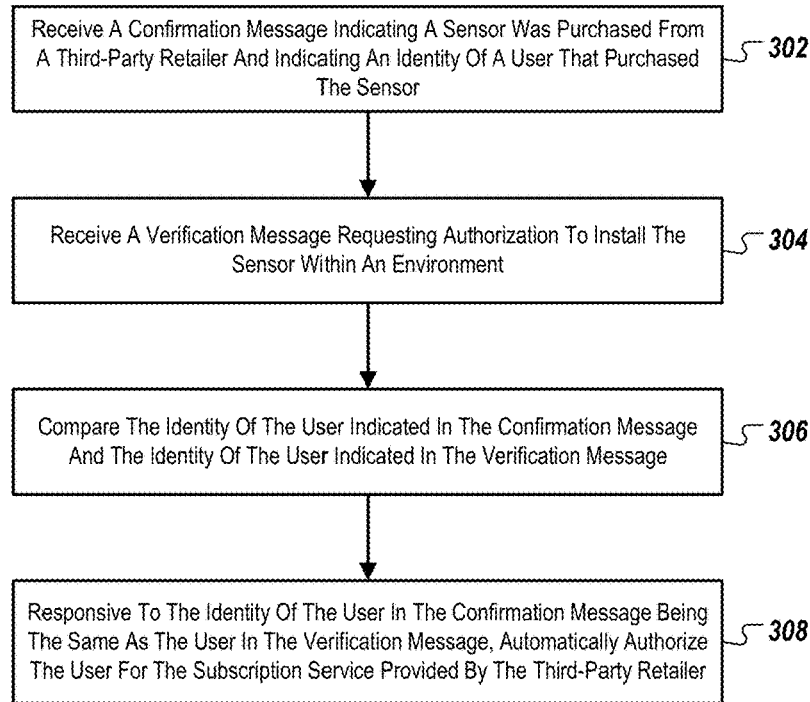

Receive A Confirmation Message Indicating A Sensor Was Purchased From A Third-Party Retailer And Indicating An Identity Of A User That Purchased The Sensor ⌐ 302

Receive A Verification Message Requesting Authorization To Install The Sensor Within An Environment ⌐ 304

Compare The Identity Of The User Indicated In The Confirmation Message And The Identity Of The User Indicated In The Verification Message ⌐ 306

Responsive To The Identity Of The User In The Confirmation Message Being The Same As The User In The Verification Message, Automatically Authorize The User For The Subscription Service Provided By The Third-Party Retailer ⌐ 308

*FIG. 3*

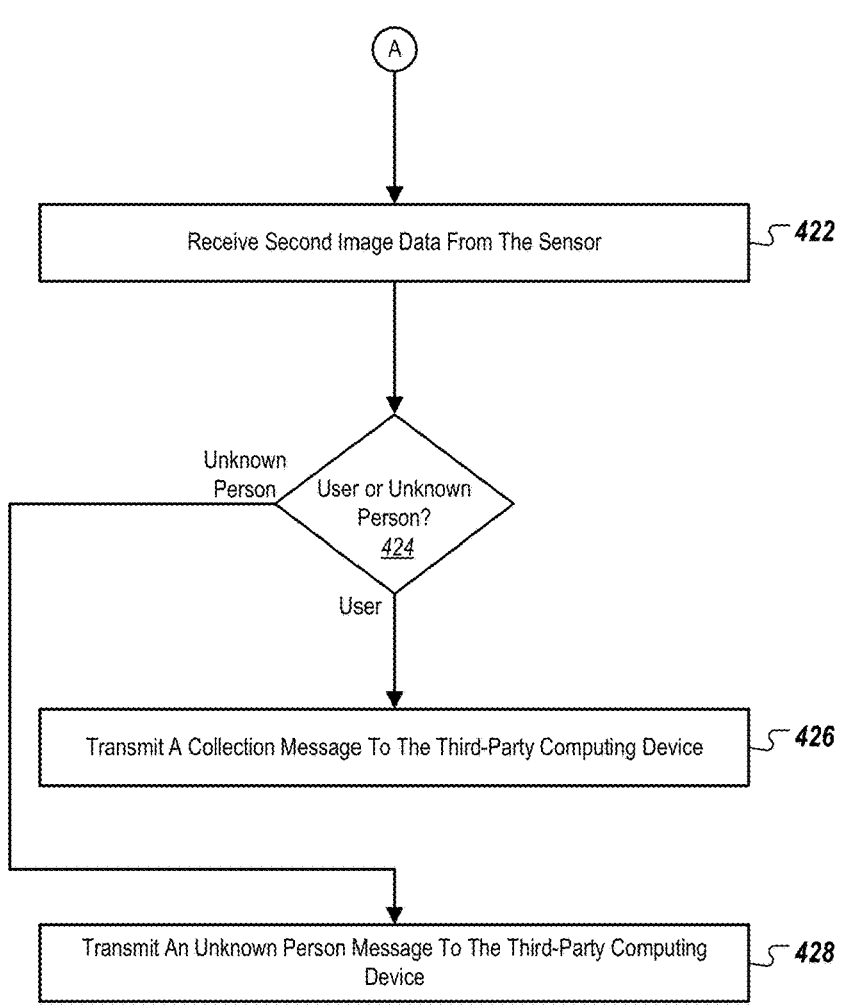
*FIG. 4B*

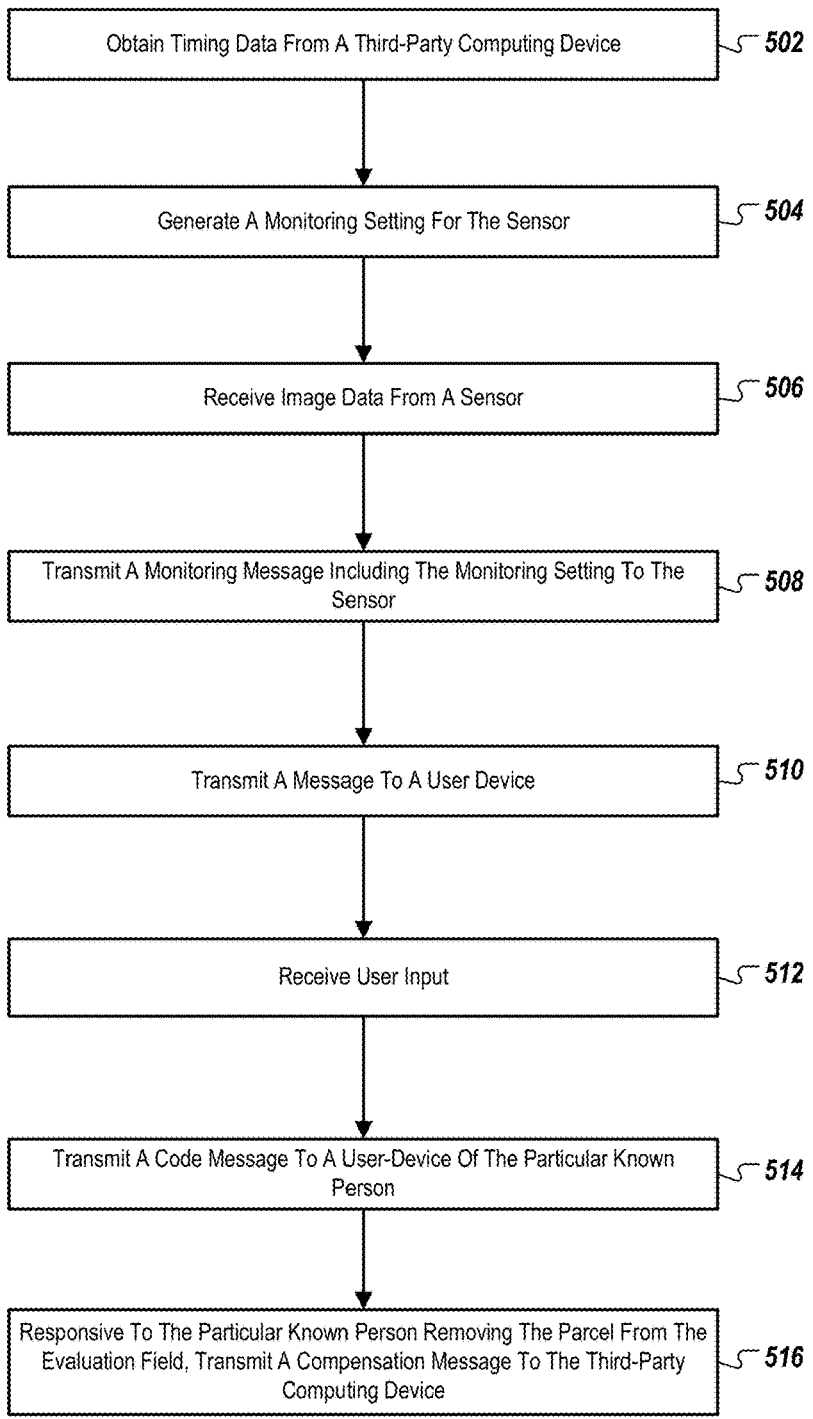

500

| | |
|---|---|
| Obtain Timing Data From A Third-Party Computing Device | 502 |
| Generate A Monitoring Setting For The Sensor | 504 |
| Receive Image Data From A Sensor | 506 |
| Transmit A Monitoring Message Including The Monitoring Setting To The Sensor | 508 |
| Transmit A Message To A User Device | 510 |
| Receive User Input | 512 |
| Transmit A Code Message To A User-Device Of The Particular Known Person | 514 |
| Responsive To The Particular Known Person Removing The Parcel From The Evaluation Field, Transmit A Compensation Message To The Third-Party Computing Device | 516 |

*FIG. 5*

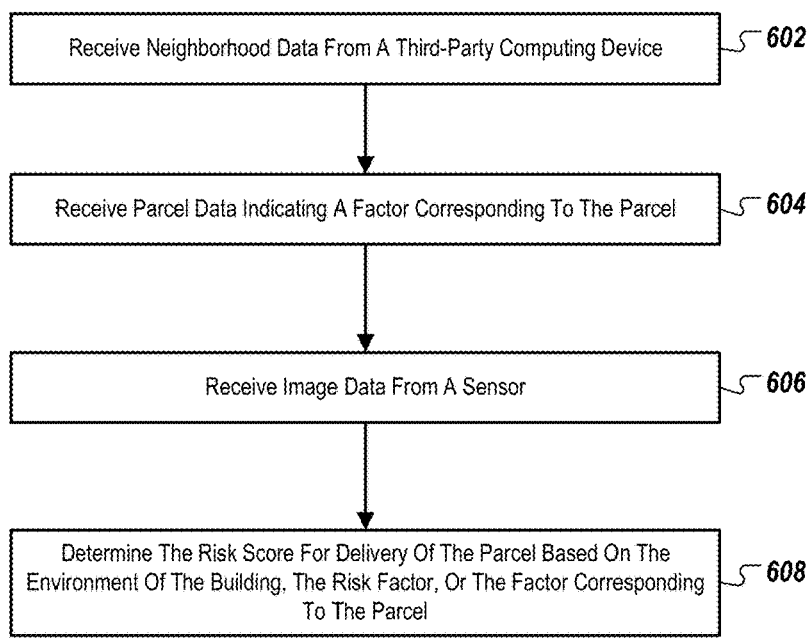
Receive Neighborhood Data From A Third-Party Computing Device ⌐ 602
Receive Parcel Data Indicating A Factor Corresponding To The Parcel ⌐ 604
Receive Image Data From A Sensor ⌐ 606
Determine The Risk Score For Delivery Of The Parcel Based On The Environment Of The Building, The Risk Factor, Or The Factor Corresponding To The Parcel ⌐ 608
*FIG. 6*

AUTOMATION SYSTEM TO TRACK A PARCEL

CROSS REFERENCE TO RELATED APPLICATION

This application is a claims priority to U.S. Patent Application Ser. No. 63/519,828, filed Aug. 23, 2023, the entire contents of which are hereby incorporated by reference as though fully set forth herein.

BACKGROUND

Automation systems are widely deployed in an environment (e.g., a residential, a commercial, or an industrial setting). The automation systems often include security subsystems that are designed to monitor objects and preform appropriate response actions. Correctly detecting objects is critical to monitoring the objects and identifying an appropriate response action. However, as demand for automation systems that provide security capabilities increases, some automation systems fail to provide accurate and reliable detection of objects and, therefore, monitoring of the objects, which often causes implemented response actions to be ineffective.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Embodiments will be described and explained with additional specificity and detail through the use of the accompanying drawings, in which:

FIG. 3 illustrates a flow diagram of a method to authorize a user for a subscription service;

FIGS. 4A and 4B illustrate flowcharts of an example method to monitor a parcel;

FIG. 5 illustrates a flowchart of another example method to monitor a parcel; and FIG. 6 illustrates a flowchart of an example method to determine a risk score for delivery of a parcel;

Figure 1:
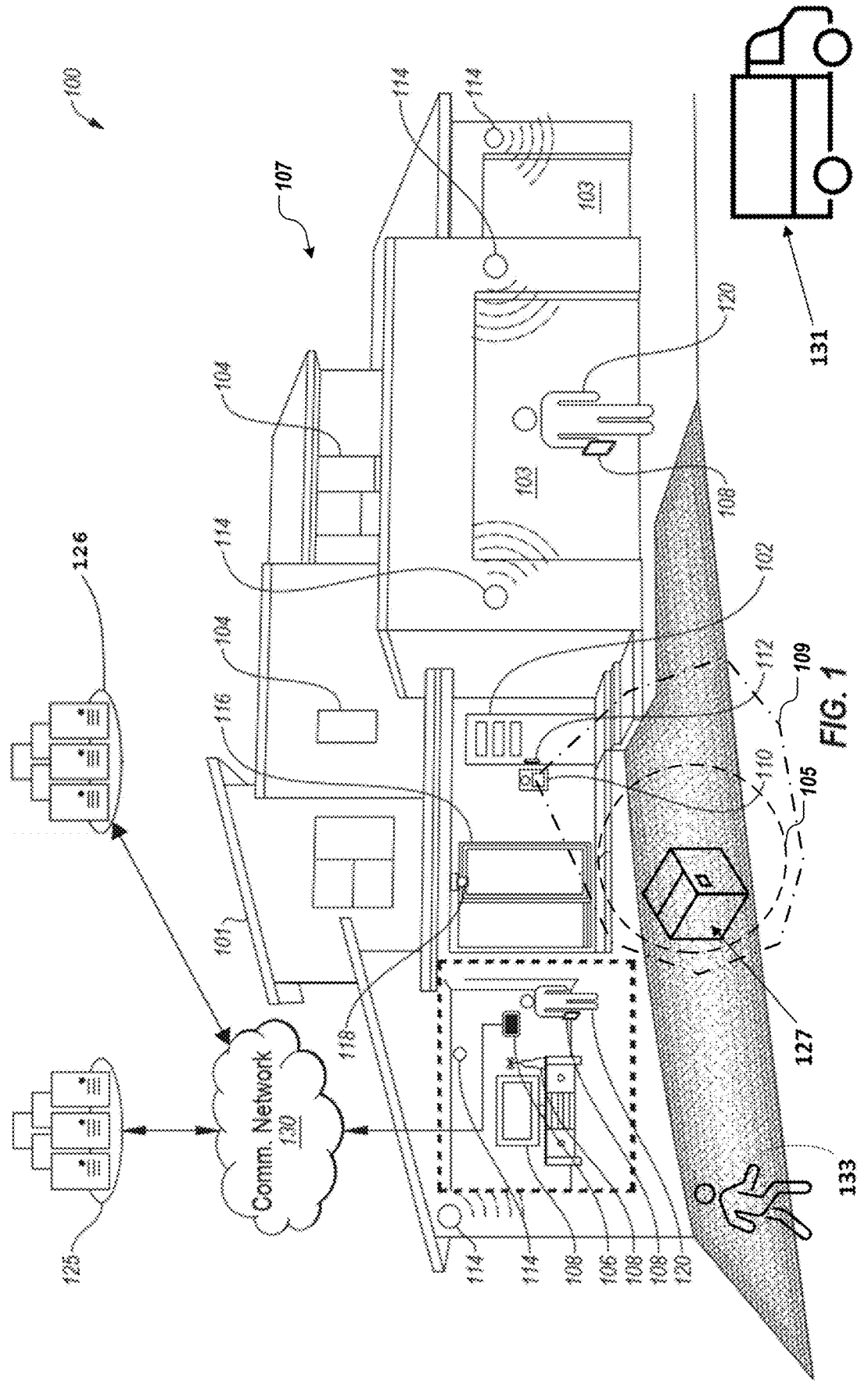
FIG. 1 illustrates an example environment that includes a security and automation system in accordance with aspects of the present disclosure.

all according to at least one embodiment described in the present disclosure.

DETAILED DESCRIPTION

An automation system may employ sensors at entry and exit points, along with interior sensors (e.g., motion detectors, sound sensors, and glass break sensors) to monitor an environment of and/or around a building. The environment, according to the present disclosure, may include an area in and around a building. For example, the environment may include a residential structure such as a home or a commercial structure, such as a warehouse, garage, store, or gym. In addition, the automation system may employ security cameras that perform various operations related to monitoring the environment.

Embodiments described herein relate to a security subsystem within an automation system (referred to in the present disclosure as "security and automation system") that is capable of monitoring installation of a sensor and/or objects that are placed within a region of interest (ROI) of an evaluation field of a sensor. In addition, the security and automation system may perform various response actions based on installation of the sensor, an identity of the object, an identity of a person that placed the parcel within the ROI, an identity of a vehicle that brought the parcel to the environment, a timing that the parcel was placed in the ROI, and other factors.

In one embodiment, the security and automation system may receive a confirmation message indicating that the sensor was purchased from a third-party retailer. The security and automation system may determine an identity of the user that purchased the sensor based on the confirmation message. The user may install the sensor, which may cause the sensor to transmit a verification message. The security and automation system may receive the verification message requesting authorization to install the sensor within the environment. In addition, the security and automation system may determine an identity of the user that is installing the sensor based on the verification message. The security and automation system, responsive to the identity of the user installing the sensor being the same as the user that purchased the sensor, may automatically authorize the user for a subscription service provided by the third-party retailer.

In some embodiments, the sensor may gather data from the evaluation field. The evaluation field, according to the present disclosure, may include an area from which the sensor may be capable of gathering data. In some embodiments, the ROI may be a part or portion of the evaluation field. For example, the sensor may include a video camera sensor and the evaluation field may include all of a property in front of the building and the ROI may include a driveway or a porch of the building.

Any number of different types of sensors may be included in the security and automation system of the present disclosure. For example, the sensor may include a doorbell that includes an image sensor, such as a camera, and the data gathered may include one or more images or videos (e.g., a series of sequential images over a period of time). In this embodiment, the evaluation field may be the boundaries, or edges, of the images captured by the image sensor. In these and other embodiments, the sensor may include the doorbell that includes an audio sensor, such as a microphone, and the data gathered may include one or more sounds. In this embodiment, the evaluation field may include the boundaries within which the sensor is capable of detecting sound.

In some embodiments, the security and automation system may receive data from the sensor and use this data to determine whether the parcel has been placed in the ROI, the parcel was removed from the ROI, the parcel was removed by a user, the parcel was removed by an unknown person, or other appropriate determinations. In addition, the security and automation system may use this data to aid in crime detection and prevention and in supporting time-based insurance policies. The time-based insurance policies may provide insurance coverage of the parcel for a length of time (e.g., thirty minutes, one hour, two hours, half day, or other any other appropriate length of time) after being placed in the ROI (e.g., after being delivered) to incentivize the user to order goods that may be stolen after being delivered. However, determining whether the parcel was actually stolen and/or whether the parcel was stolen during the length of time that the insurance policies are in effect can be difficult.

The security and automation system may enable the time-based insurance policies. For example, the security and automation system may receive a message from a third-party computing device that includes timing data. The timing data may indicate the length of time that the parcel is insured (e.g., the length of time that the parcel is to be monitored after delivery). In addition, the security and automation system may generate a monitoring setting for the sensor. The sensor may capture data (e.g., image data, sound data, radar data, or any other appropriate data) within the ROI or the entire evaluation field based on the on the monitoring setting.

The security and automation system may receive and analyze the data to validate placement of the parcel in the ROI (delivery of the parcel), verify removal of the parcel from the ROI (pickup of the parcel), determine whether the parcel was removed by the user, determine whether the parcel was stolen (removed by an unknown user), and/or whether the parcel was stolen during the length of time that the insurance policies were in effect. Further, the security and automation system may provide notices to the user indicating delivery of the parcel, a content of the parcel, a parcel type of the parcel, or other information based on the image data. In addition, the security and automation system may receive user input authorizing a known person (e.g., a friend of the user) that is authorized to remove the parcel from the ROI.

In one embodiment, the security and automation system may determine a risk score for delivery of the parcel. Alternatively, the security and automation system may enable the third-party that is providing the time-based insurance policies to determine the risk score for delivery of the parcel. The security and automation system may receive neighborhood data from the third-party computing device. The neighborhood data may indicate a risk factor of a neighborhood of the building. The security and automation system may also receive parcel data indicating a factor of the parcel. The sensor may capture the data (e.g., image data, sound data, or any other appropriate data) within the evaluation field. The security and automation system may determine the risk score based on the data (e.g., the environment) the risk factor, and/or the factor of the parcel.

Turning to the figures, FIG. 1 illustrates an environment 107 that includes a security and automation system 100 in which the present systems and methods may be implemented. The environment 107 may include a building 101 and an outdoor area surrounding the building 101, or any number of different structures. The building 101 may include a residence such as a home. Alternatively, the building 101 may include a commercial or industrial building such as an office, a warehouse, a garage, and the like. The building 101 includes various entryways, such as doors 102, garage doors 103, and windows 104.

In some embodiments, the security and automation system 100 may be implemented as a home security system. In such an embodiment, the security and automation system 100 may prevent, detect, deter, or mitigate the effects of intrusions, crimes, natural disasters, or accidents occurring within the environment 107.

The security and automation system 100 may include a plurality of components. These components may include, but are not limited to, devices such as a controller 106, control panels, servers, a computing device 108 (e.g., a desktop computer, a laptop computer, a tablet, a mobile device, a smartphone, or a personal computer), displays, gateways, cameras, processors, data collection devices, automation/security devices, devices with memory, alarm devices with audio and/or visual capabilities, sensors 114, heating, ventilation, and air conditioning (HVAC) devices (e.g., thermostats, fans, heaters, or the like), appliances, interface devices, smart switches, speakers, a doorbell sensor 110 (referred to as "sensor 110" in the present disclosure), a smart lock 112, and output devices 115.

The security and automation system 100 may detect a potential parcel theft through the sensors 114 and/or the sensor 110. The security and automation system 100 may do this by monitoring areas that are outside of the building 101 or even outside of the environment 107. The security and automation system 100 can include interfaces that that communicate such threats to the user 120. Detection devices of the security and automation system 100 may also communicate these threats to a device of the security and automation system 100 capable of relaying the message to the user 120. For example, messages may be received by the user 120 from the security and automation system 100 through the computing device 108.

The components of the security and automation system 100 may be communicatively coupled to each other through wired and/or wireless communication links. These communication links may include, for example, a communication network 130, which may include a Personal Area Network (PAN), a Local Area Network (LAN), a Metropolitan Area Network (MAN), a Wide Area Network (WAN), a Storage Area Network (SAN), a cellular network, the Internet, or some combination thereof. The communication network 130 may be a mobile telephone network. The communication network 130 may also employ a Wi-Fi network based on any one of the Institute of Electrical and Electronics Engineers ("IEEE") 802.11 standards. Alternatively, the wireless network may include a Bluetooth® connection. In addition, the wireless network may employ Radio Frequency Identification ("RFID") communications including RFID standards established by the International Organization for Standardization ("ISO"), the International Electrotechnical Commission ("IEC"), the American Society for Testing and Materials® (ASTM®), the DASH7™ Alliance, and/or EPCGlobal™.

In one embodiment, the communication network 130 may employ a ZigBee® connection based on the IEEE 802 standard. In such an embodiment, the wireless network includes a ZigBee® bridge. In one embodiment, the wireless network employs a Z-Wave® connection as designed by Sigma Designs®. Alternatively, the wireless connection may employ an ANT® and/or ANT+® connection as defined by Dynastream® Innovations Inc. of Cochrane, Canada.

The devices of the security and automation system 100 may operate in various subsystems. Subsystems of the security and automation system 100 may include, but are not limited to, security, HVAC, lighting, electrical, fire control, and energy management systems. For example, as provided in more detail in connection with FIG. 2, the security and automation system 100 may include a security subsystem (such as denoted 200 in FIG. 2).

Components of the security and automation system 100 may include data collection or user input capabilities. In some embodiments, these components may be implemented to determine different behaviors of the user 120, a third-party person 133, a delivery vehicle 131, or some combination thereof within the environment 107. These components may include, but are not limited to the sensors 114, the sensor 110, cameras, tracking devices, feedback mechanisms, interfaces, switches, and microphones.

The security and automation system 100 may also include several components capable of both collecting and outputting data through user interfaces. These interfaces may be accessed by the user 120 through an application configured for access through the web, a mobile device, and/or a tablet (e.g., the computing device 108). The user 120 may also access them via a terminal or control panel within the building 101.

The controller 106 may control the components of the security and automation system 100. The controller 106 may be any suitable computing device. The controller 106 may include both software and hardware components. For example, the controller 106 may include a processor, a user interface, a means of remote communication (e.g., a network interface, modem, gateway, or the like), a memory, a sensor, and/or an input/output port. The memory of the controller 106 may include instructions executable to perform various functions relating to automation and control of the security and automation system 100. In some embodiments, the controller 106 may communicate with other components of the security and automation system 100 over a common wired or wireless connection. The controller 106 may also communicate to outside networks, such as the Internet.

In some embodiments, the controller 106 may be part of the security and automation system 100. For example, the controller 106 may be part of, integrated with, and/or in communication with a control panel, an IoT or smart device (e.g., a light bulb, a light switch, the sensor 110, the smart lock 112, or the like), the sensors 114, the computing device 108, a remote computing device 125 (e.g., a server), a third-party computing device 126 (e.g., a server), and/or output devices 115. In these and other embodiments, the controller 106 may be a standalone device. For example, the controller 106 may be a smart speaker, a speech synthesizer, a virtual assistant device, or any combination thereof. The controller 106 may also be the control panel.

In some embodiments, the components of the security and automation system 100 may communicate with the remote computing device 125 and/or the third-party computing device 126 using application program interfaces (APIs).

In some embodiments, the controller 106 may be integrated with and/or in communication with a remote service such as the remote computing device 125. For example, the controller 106 may be located remotely to the environment 107. The controller 106 may cause components of the security and automation system 100 to perform various actions based on data and/or input received from the sensors 114, the sensor 110, or the user 120. Additionally or alternatively, the controller 106 may cause components of the security and automation system 100 to perform various actions based on occurrence of certain events and/or actions of the user 120, the third-party person 133, or the delivery vehicle 131. In some embodiments, the controller 106 may receive instructions and/or information from the third-party computing device 126. The third-party computing device 126 may be associated with and maintained by a third-party that is different than a party associated with the security and automation system 100 and/or the user 120.

In some embodiments, the controller 106 may include several physical inputs. The user 120 may enter information using these inputs. Inputs may include, for example, devices such as keypads, keyboards, touch screens, buttons, switches, microphones, cameras, motion sensors, or any combination thereof. The user 120 may input data manually via, for example, the control panel, mobile computing device, desktop computing device, navigation system, gaming system, or appliance (e.g., television, HVAC, and the like). The user 120 may also input data or select controls via one or more data collection devices. For example, the user 120 may provide input via a microphone.

The controller 106 may also include an output display. This display may show the status of the security and automation system 100 or of various components of the security and automation system 100. In some embodiments, the output display may be part of a graphical user interface ("GUI") through which the security and automation system 100 may also receive inputs from the user 120. The display and/or interface of the controller 106 may provide information to the user 120.

Other devices of the security and automation system 100 can also allow the user 120 to interact with the security and automation system 100 even if they are not in physical proximity to the environment 107 or any of the devices within the security and automation system 100. For example, the user 120 may communicate with the controller 106 or another component of the security and automation system 100 using the computing device 108. A mobile or web application or web page may receive input from the user 120 and communicate with the controller 106 to control the components of the security and automation system 100. Such a page or application may also communicate information about the device's operation to the user 120.

The user 120 may also be able to view the status of the security and automation system 100 or of the components of the security and automation system 100 through the display of the controller 106. Alternatively or additionally, the controller 106 may be able to communicate the status of the security and automation system 100 to the user 120 through such means as audio outputs, lighting elements, messages and/or notifications transmitted to the computing device 108, or any combination thereof. The controller 106 can transmit messages or notifications to the user 120 regarding the status of the components of the security and automation system 100.

The controller 106 may allow the user 120 to control the components of the security and automation system 100. For example, the user 120 may activate the sensor 114 and/or the sensor 110 through the controller 106. The user 120 may also add components to the security and automation system 100 through the controller 106. For example, if the user 120 purchases the sensor 110 and adds it to the security and automation system 100, they may do so by making inputs and/or selections through the controller 106.

In some embodiments, the initial setup/configuration of the security and automation system 100 may be done through the controller 106. For example, when the security and automation system 100 is first implemented or installed within the premises, the user 120 may use the controller 106 to add and connect each component of the security and automation system 100 and to setup or configure their preferences.

The controller 106 may track and/or store data and/or information related to the security and automation system 100 and/or operation of the security and automation system 100. For example, the controller 106 may store data and/or information in a memory of the controller 106 and/or in memory at the components of the security and automation system 100. This data/information can include, for example, user preferences, weather forecasts, timestamps of entry to and departure from a structure, user interactions with a component of the security and automation system 100, settings, data captured by the sensors 114, data captured by the sensor 110, and other suitable data and information.

The sensors 114 may include motion sensors, depth sensors, temperature sensors, pressure sensors, light sensors, entry sensors such as window or door sensors that are used to detect when a window or door (or other entryway) is open or closed, carbon monoxide detectors, smoke detectors, water leak sensors, microphones and/or other audio sensors used to detect and/or differentiate sounds such as breaking glass, closing doors, music, dialogue, and/or the like, infra-red sensors, cameras, and/or the like.

In some embodiments, the sensor 110 may include a smart doorbell and may be equipped with a sensor such as a camera, touch, or motion sensor. For example, the sensor 110 may include an integrated camera, a light sensor, and a motion sensor. The light sensor may be used to configure camera settings of the camera, e.g., for light or dark image capture, and the motion sensor may be used to activate the camera, to send a notification that a person is at the door, and/or the like in response to the detected motion. Further-more, the doorbell may include a physical button to activate a wired or wireless chime within the building, a notification or sound from a mobile application associated with the doorbell, and/or the like.

In one embodiment, the controller 106, the remote com-puting device 125, the computing device 108, and/or the like, may include image processing capabilities for analyz-ing images, videos, or the like that are captured with the sensor 110. The image processing capabilities may include object detection, facial recognition, gait detection, weight detection, and/or the like. For example, the controller 106 may analyze or process images from the sensor 110 to determine that a parcel 127 is being placed within an evaluation field 109 of the sensor 110. In particular, the controller may analyze or process images from the sensor 110 to determine that the parcel 127 is being placed within an ROI 105 of the evaluation field 109. In other examples, the controller 106 may analyze or process images to detect the third-party person 133 and/or the delivery vehicle 131. In certain embodiments, the controller 106 may utilize artificial intelligence and machine learning image process-ing methods for processing and analyzing image data.

Figure 2:
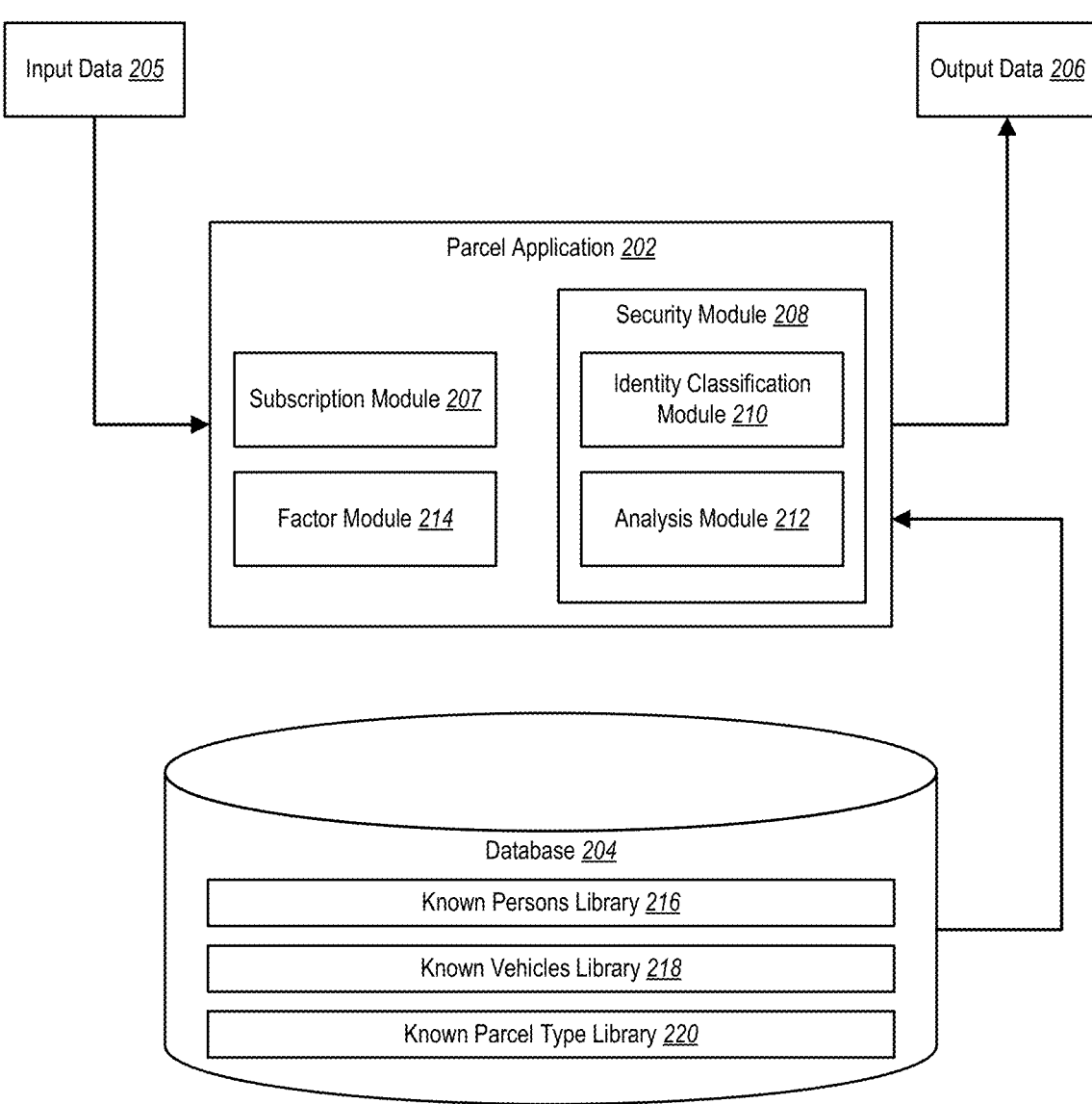
FIG. 2 illustrates components of a security subsystem of a security and automation system.

FIG. 2 illustrates components of a security subsystem 200 of a security and automation system, such as the security and automation system 100 of FIG. 1. The security subsystem 200 includes a parcel application 202 and a database 204. The parcel application 202 may be part of a controller, such as the controller 106 illustrated in FIG. 1. Alternatively, the parcel application 202 may be installed on a mobile device, such as the computing device 108 of FIG. 1 or on a remote computing device such as the remote computing device 125 of FIG. 1.

With combined reference to FIGS. 1 and 2, in some embodiments, the parcel application 202 may be configured to process or otherwise use input data 205 to detect objects (e.g., the parcel 127, the third-party person 133, the user 120, or the delivery vehicle 131), detect events (e.g., placement of the parcel 127 within the ROI 105 or removal of the parcel 127 from the ROI 105), and, through output data 206, perform an appropriate action in response to the objects and/or events.

The input data 205 may be received from multiple sources and may include data from the sensors 114, the sensor 110, the computing device 108, the remote computing device 125, and/or the third-party computing device 126. For example, the input data 205 may be received from an image sensor, such as a camera of the sensor 110, that includes one or more images. In another embodiment, the sensor 110 may include an audio sensor and the input data 205 may include audio data. The input data 205 may include image data, data, video data, audio data, or some combination thereof.

Concept 1

In some embodiments, the input data 205 may include a confirmation message and/or a verification message. The confirmation message may be received from the third-party computing device 126 and may indicate that the sensor 110 was purchased from a third-party retailer by the user 120. The third-party retailer may be associated with a subscrip-tion service that the user 120 qualifies for once the sensor 110 is installed in the environment 107. The verification message may indicate that the user 120 is requesting autho-rization to install the sensor 110 in the environment 107.

The parcel application 202 may include a subscription module 207 configured to receive the confirmation message and/or the verification message. The subscription module 207 may determine that the user 120 purchased the sensor 110 based on the confirmation message and that the user 120 is requesting authorization to install the sensor 110 in the environment 107 based on the verification message. For example, the subscription module 207 may compare an identity of the user 120 indicated in the confirmation mes-sage and an identity of the user indicated in the verification message. Responsive to the identity of the user 120 being the same in the confirmation message and the verification mes-sage, the subscription module 207 may automatically autho-rize the user 120 for the subscription service provided by the third-party retailer. For example, the subscription service may send the output data 206 to the third-party computing device 126, which may permit the third-party retailer to authenticate and initiate an account for user 120 for the subscription service.

Concept 2

In some embodiments, the input data 205 may include timing data and/or image data. The timing data may be received from the third-party computing device 126 and may indicate a length of time that the parcel 127 is to be monitored within the ROI 105. Additionally or alternatively, the timing data may indicate a length of time that the parcel 127 is insured after being placed within the ROI 105. The image data may be received from the sensor 110 and may indicate that the third-party person 133 includes a delivery person that placed the parcel 127 within the ROI 105.

The parcel application 202 may include a security module 208 that includes an identity classification module 210 and an analysis module 212. The analysis module 212 may receive the timing data. The analysis module 212 may generate a monitoring setting for the sensor 110 based on the timing data. The monitoring setting may indicate a length of time that the sensor 110 is to monitor the parcel 127 after the third-party person 133 places the parcel 127 within the ROI 105. In addition, the monitoring setting may indicate motion sensitivity, image resolution, and other settings for the sensor 110. For example, the monitoring setting may indi-cate that the sensor 110 is to transmit additional image data if the parcel 127 is removed from the ROI 105. The analysis module 212 may transmit the monitoring setting to the sensor 110 as the output data 206.

The identity classification module 210 and the analysis module 212 may receive the image data. The identity classification module 210 may identify the parcel 127 and determine that the parcel is located within the ROI 105 based on the image data. The analysis module 212 may determine a time that the third-party person 133 placed the parcel 127 within the ROI 105. For example, the image data may include a time stamp and the analysis module 212 may determine the time that the parcel 127 was placed within the ROI based on the corresponding time stamp.

The analysis module 212 may track an amount of time that has elapsed since the parcel 127 was placed in the ROI 105. The analysis module 212 may compare the amount of time that has elapsed since the parcel 127 was placed in the ROI 105 to the length of time that the parcel 127 is to be monitored (e.g., the length of time that the parcel 127 is insured). In addition, the analysis module 212 may determine if the additional image data has been received indicating that the parcel 127 has been removed from the ROI 105.

Responsive to the length of time that the parcel 127 is to be monitored elapsing and not receiving the additional image data, the analysis module 212 may trigger the sensor 110 to capture further image data indicating that the parcel 127 is still within the ROI 105. In addition, the analysis module 212 may transmit a message as the output data 206 to the third-party computing device 126 indicating that the parcel 127 is still within the ROI 105. The message may indicate that the parcel 127 is no longer insured and may include the further image data as proof that the parcel 127 was still within the ROI 105 when the length of time elapsed.

In some embodiments, responsive to the length of time that the parcel 127 is to be monitored elapsing and not receiving the additional image data, the analysis module 212 may transmit another message as the output data 206 to the computing device 108 indicating that the parcel 127 is still within the ROI 105. The message to the computing device 108 may also indicate that the parcel 127 is no longer insured and may include the further image data as proof that the parcel 127 was still within the ROI 105 when the length of time elapsed. Further, the message to the computing device 108 may indicate that the length of time that the parcel 127 insured (e.g., the length of time the parcel 127 is to be monitored within the ROI 105) can be extended via payment of money to the third-party associated with the third-party computing device 126.

In some embodiments, responsive to receiving the additional image, the analysis module 212 may transmit a message as the output data 206 to the third-party computing device 126 indicating that the parcel 127 has been picked up. In these and other embodiments, the identity classification module 210 may determine whether the parcel 127 was removed by the user 120, the third-party person 133, or an unknown user. To do this, the identity classification module 210 may determine whether the person that removed the parcel 127 is a known person or an unknown person. To determine whether the person is a known person, the identity classification module 210 may access a known persons library 216, which may be stored within the database 204.

The known persons library 216 may contain data associated with known persons. For example, if the parcel application 202 is in use at a house, data associated with the residents of the house, friends of the residents, family of the residents, or frequent visitors such as maintenance personnel parcel delivery personnel may be stored in the known persons library 216. As another example, if the parcel application 202 is in use at a warehouse, data associated with the people that work at the warehouse or frequently visit the warehouse may be stored in the known persons library 216.

The data in the known persons library 216 may include any data that can be used to identify a person. For example, the data may include images such as a facial feature, a retinal scan, height data, movement data such as gait, posture data, sound data including a person's voice.

To determine whether the person is known, the identity classification module 210 may obtain image data and/or sound data from the sensor 110 and compare it to the data in the known persons library 216. For example, the identity classification module 210 may compare the additional image data with image data for known persons stored in the known persons library 216. The identity classification module 210 may compare sound data received from the sensor 110 with sound data for known persons stored in the known persons library 216. Based on these comparisons, the identity classification module 210 may determine whether the person is a known person or an unknown person. This determination may be based on artificial intelligence trained models or other standard person recognition methods techniques.

In some embodiments, the identity classification module 210 may identify and store image data of persons that frequently visit and are invited into the environment 107. The identity classification module 210 may periodically present these images to a security account manager and ask whether the persons should be included within the known persons library 216. If the identity classification module 210 does not identify the person as a known person, the identity classification module 210 may identify the person as an unknown person.

In some embodiments, the input data 205 may indicate a location of the user 120 and the analysis module 212 may determine a travel time for the user 120 to travel from the location to the ROI 105. In addition, the travel time may be for the user 120 to remove the parcel 127 from the ROI 105. The analysis module 212 may compare the travel time to an amount of time remaining in the length of time that the parcel 127 is to be monitored. Responsive to the travel time being greater than the remaining amount of time, the analysis module 212 may transmit a notice message as the output data 206 to the computing device 108. The notice message may indicate that the travel time is greater than the remaining amount of time.

Concept 4

In some embodiments, the identity classification module 210 may determine whether the delivery vehicle 131 is a known delivery vehicle or an unknown delivery vehicle. To determine whether the delivery vehicle 131 is a known delivery vehicle, the identity classification module 210 may access a known delivery vehicles library 218, which may be stored within the database 204.

The known delivery vehicles library 218 may contain data associated with known delivery vehicles. For example, the data may be associated with Amazon delivery vehicles, FedEx delivery vehicles, UPS delivery vehicles, DHL delivery vehicles, or any other appropriate delivery vehicle. The data in the known delivery vehicles library 218 may include any data that can be used to identify the delivery vehicle 131. For example, the data may include images of various delivery vehicles.

To determine whether the delivery vehicles is a known delivery vehicle, the identity classification module 210 may obtain data from the sensor 110 and compare it to the data in the known delivery vehicles library 218. For example, the identity classification module 210 may compare the additional image data with image data for known delivery vehicles stored in the known delivery vehicles library 218. Based on these comparisons, the identity classification module 210 may determine whether the delivery vehicle 131 is a known vehicle or an unknown vehicle. This determination may be based on artificial intelligence trained models or other standard person recognition methods techniques.

In some embodiments, the identity classification module 210 may identify and store image data of delivery vehicles that frequently visit and are invited into the environment 107. The identity classification module 210 may periodically present these images to a security account manager and ask whether the delivery vehicles should be included within the known delivery vehicles library 218.

In some embodiments, the input data 205 may include the input data 205 as a parcel message. The parcel message may be received from the third-party computing device 126 and may indicate a content of the parcel 127. The analysis module 212 may determine that the parcel 127 corresponding to the parcel message corresponds to the corresponds to the parcel message based on the identity the delivery vehicle 131. For example, the analysis module 212 may determine that the delivery vehicle 131 is a known delivery vehicle associated with a specific third-party retailer and based on this the analysis module 212 may determine that the parcel 127 corresponds to the parcel message. The analysis module 212 may transmit a message as the output data 206 to the computing device 108 indicating that the parcel containing the contents was placed within the ROI 105.

In some embodiments, the analysis module 212 may trigger speakers within the building 101 to play a notification, a chime, or other message informing the user 120 that the parcel 127 was placed within the ROI 105. For example, the analysis module 212 may determine that the content of the parcel 127 is a basketball and may trigger the speakers to play a notification, a notification sound, or a voice message. The voice message may include "The basketball was delivered." As another example, the analysis module 212 may determine that the delivery vehicle 131 is associated with a first delivery company and may trigger the speaker to play the notification saying, "The parcel 127 was just delivered by the first delivery company."

In some embodiments, the identity classification module 210 may determine whether the parcel 127 is a known parcel type or an unknown parcel type. To determine whether the parcel 127 is a known parcel type, the identity classification module 210 may access a known parcel type library 220, which may be stored within the database 204.

The known parcel type library 220 may contain data associated with parcels such groceries. The data in the known parcel type library 220 may include any data that can be used to identify the parcel 127. For example, the data may include images of various parcels.

To determine whether the parcel 127 is a known parcel, the identity classification module 210 may obtain data from the sensor 110 and compare it to the data in the known parcel type library 220. For example, the identity classification module 210 may compare the additional image data with image data for known parcel types stored in the known parcel type library 220. Based on these comparisons, the identity classification module 210 may determine whether the parcel 127 is a known parcel type or an unknown parcel type. This determination may be based on artificial intelligence trained models or other standard person recognition methods techniques.

In some embodiments, the identity classification module 210 may identify and store image data of parcel types that are frequently delivered to environment 107. The identity classification module 210 may periodically present these images to a security account manager and ask whether the parcel types should be included within the known parcel type library 220.

In some embodiments, the analysis module 212 may trigger speakers within the building 101 to play a notification, a chime, or other message informing the user 120 that the parcel 127 was placed within the ROI 105 based on the parcel type. For example, the analysis module 212 may trigger the speakers to play a notification saying, "The groceries were delivered."

Concept 5

In some embodiments, the analysis module 212 may transmit another message as the output data 206 to the computing device 108 indicating that the parcel 127 was placed within the ROI 105. The message to the computing device 108 may also indicate that the user 120 can authorize a known person to remove the parcel 127 from the ROI 105. In these and other embodiments, the analysis module 212 may receive user input from the computing device 108 as the input data 205. The user input may indicate an identity of a particular known person that is authorized to remove the parcel from the ROI 105 as the third-party person 133. The user input may also indicate an amount of money the third-party person 133 is to receive when removing the parcel 127 from the ROI 105.

In some embodiments, responsive to receiving the additional image, the identity classification module 210 may determine whether the parcel 127 was removed by the third-party person 133 as discussed above. Responsive to the third-party person 133 removing the parcel 127 from the ROI 105, the analysis module 212 may transmit a compensation message to the third-party computing device 126 as the output data 206. The compensation message may indicate that the third-party person 133 removed the parcel 127. In addition, the compensation message may indicate the amount of money the third-party person 133 is to receive.

The analysis module 212 may transmit a code message to a user-device of the third-party person 133 as the output data 206. The code message may indicate an authorization code that the third-party person 133 is to provide when removing the parcel 127 from the ROI 105 to confirm the identity of the third-party person 133.

Concept 3

In some embodiments, the input data 205 may include a neighborhood data, parcel data, image data, or some combination thereof. The neighborhood data may be received from the third-party computing device 126 and may indicate a risk factor corresponding to a neighborhood of the building 101. Examples of the neighborhood data may include but are not limited to a theft trend in the neighborhood, an address of the building 101, neighborhood statistics, regional statistics, or a number of humans associated with the building 101.

The parcel data may indicate a factor corresponding to the parcel 127. Examples of the factor corresponding to the parcel 127 may include but are not limited to a dimension of the parcel 127, a value of a content of the parcel 127, a number of packages forming the parcel 127, a day and time that the parcel 127 is expected to be placed within the ROI 105, or a perishable state of the content of the parcel 127. The image data may be representative of the environment 107 and may indicate environmental states of the environment 107. The environmental states may indicate at least one of a temperature, a moisture level, weather, or a shade level of the ROI 105. In addition, the image data may indicate at least one of a visibility of the ROI 105 from a public space, a number of humans that travel within the evaluation field 109, a number of known persons currently within the evaluation field 109, a number of unknown persons currently within the evaluation field 109, or an environmental state of the environment of the building 101.

The parcel application 202 may include a factor module 214 configured to receive the neighborhood data, the parcel data, and/or the image data. The factor module 214 may determine a risk score for delivery of the parcel 127 based on the environment of the building 101, the risk factor, or the factor corresponding to the parcel 127. Additionally or alternatively, the factor module 214 may determine an occupancy probability of the building 101 based on at least one of the image data or the risk factor. The risk score for delivery of the parcel 127 may be further based on the occupancy probability.

The factor module 214 may determine a window of time after delivery in which a majority of parcel thefts occur in the neighborhood based on the neighborhood data. In addition, the factor module 214 may determine an average pickup time of the user 120 over a period of time. Further, the factor module 214 may transmit a message to the computing device 108 as the output data 206, indicating the window after delivery in which the majority of parcel thefts occurs and the average pickup time of the user 120.

The factor module 214 may determine that the parcel 127 would be less likely to be stolen if the parcel 127 were hidden behind an obstacle such as a wall, a pillar, a bush. When the third-party person 133 is detected as placing the parcel 127 in the ROI 105, the factor module 214 could cause a speaker to play a notification saying, "Please place the parcel behind the obstacle."

Modifications, additions, or omissions may be made to the parcel application 202 without departing from the scope of the present disclosure. For example, the parcel application 202 may include additional components similar to the components illustrated in FIG. 2 that each may be configured similarly to the components illustrated in FIG. 2. Further, in some embodiments, the functionality of the parcel application 202 may be spread across two or more separate devices. For example, some of the functionality of the parcel application 202 may be performed on a mobile device such as a smart phone while other functions of the parcel application 202 may be performed on a remote server.

FIG. 3 illustrates a flow diagram of a method 300 to authorize a user for a subscription service. The method 300 may be performed by any suitable system, apparatus, or device with respect to authorizing the user for the subscription service. For example, the security and automation system 100 of FIG. 1 or the subscription module 207 of FIG. 2 may perform or direct performance of one or more of the operations associated with the method 300. The method 300 may include one or more blocks 302, 304, 306, or 308. Although illustrated with discrete blocks, the steps and operations associated with one or more of the blocks of the method 300 may be divided into additional blocks, combined into fewer blocks, or eliminated, depending on the particular implementation.

At block 302, a confirmation message indicating a sensor was purchased from a third-party retailer and indicating an identity of a user that purchased the sensor may be received. The subscription module 207 may receive the confirmation message indicating the sensor 110 was purchased from a third-party retailer and indicating an identity of the user 120. In some embodiments, the sensor 110 may include a doorbell that includes an image sensor. In some embodiments, the confirmation message may also indicate a purchase date of the sensor 110 from the third-party retailer.

At block 304, a verification message requesting authorization to install the sensor within an environment may be received. For example, the subscription module 207 may receive the verification message requesting authorization to install the sensor 110 within the environment 107. The verification message may indicate an identity of the user 120 requesting authorization to install the sensor 110.

At block 306, the identity of the user indicated in the confirmation message and the identity of the user indicated in the verification message may be compared. For example, the subscription module 207 may compare the identity of the user 120 indicated in the confirmation message and the identity of the user 120 indicated in the verification message. In some embodiments, the subscription module 207 may also determine an installation date of the sensor 110 based on the verification message. In addition, the subscription module 207 may determine an amount of time between the purchase date and the installation date.

At block 308, responsive to the identity of the user in the confirmation message being the same as the user in the verification message, the user may be automatically authorized for the subscription service provided by the third-party retailer. For example, the subscription module 207 may, responsive to the identity of the user 120 in the confirmation message being the same as the user 120 in the verification message, automatically authorize the user 120 for the subscription service provided by the third-party retailer. In some embodiments, the subscription module 207 may automatically authorize the user 120 for the subscription service provided by the third-party retailer further responsive to the amount of time between the purchase date and the installation date being equal to or less than a threshold value. In these and other embodiments, the threshold value may be equal to one month or any other appropriate amount of time.

Figure 4A:
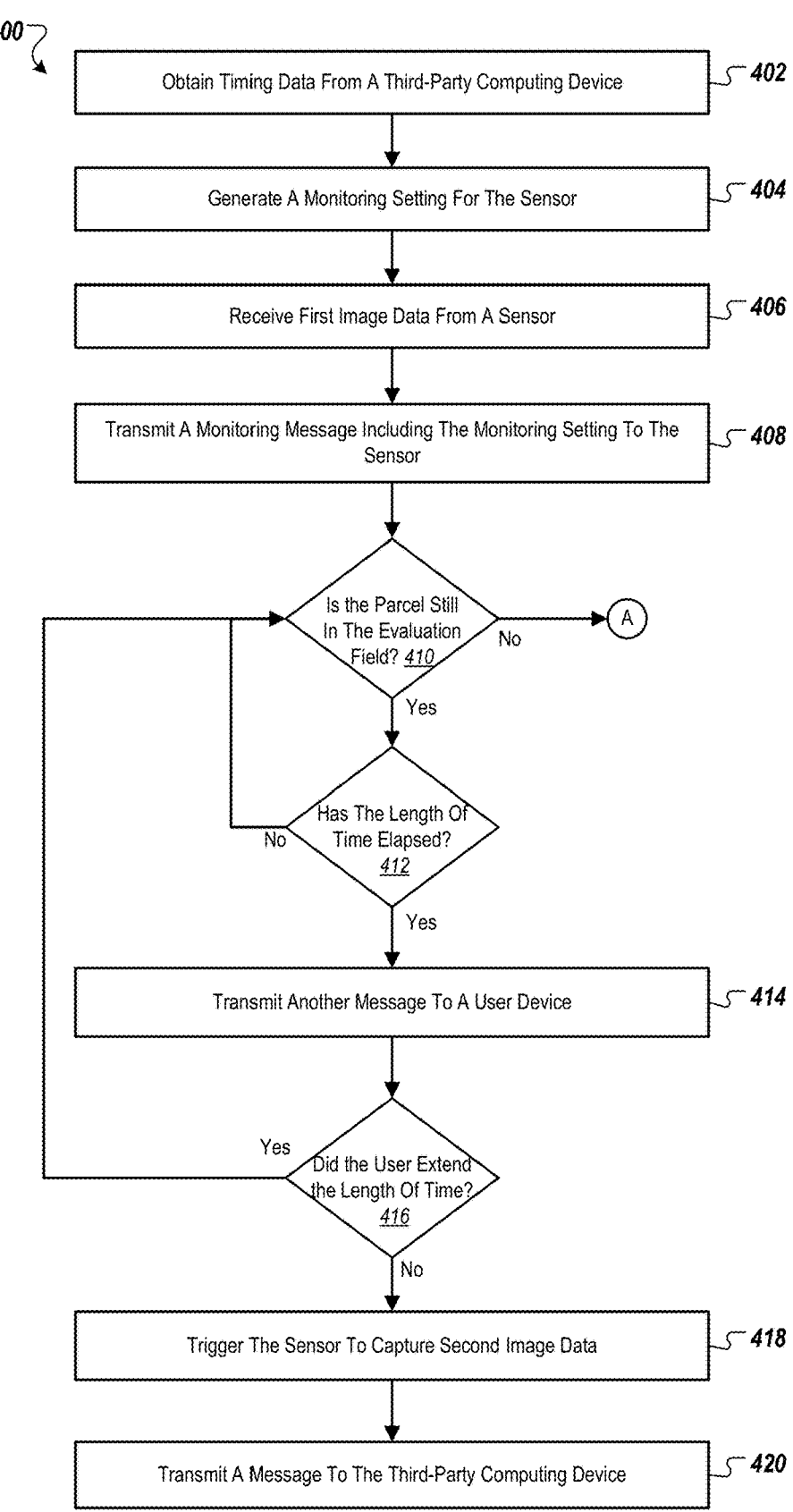

FIGS. 4A and 4B illustrate flowcharts of an example method 400 to monitor a parcel. The method 400 may be performed by any suitable system, apparatus, or device with respect to monitoring the parcel. For example, the security and automation system 100 of FIG. 1 or the security module 208 of FIG. 2 may perform or direct performance of one or more of the operations associated with the method 400. The method 400 may include one or more blocks 402, 404, 406, 408, 410, 412, 414, 416, 418, 420, 422, 424, 426, or 428. Although illustrated with discrete blocks, the steps and operations associated with one or more of the blocks of the method 400 may be divided into additional blocks, combined into fewer blocks, or eliminated, depending on the particular implementation.

At block 402, timing data may be obtained from a third-party computing device. For example, the analysis module 212 may obtain the timing data from the third-party computing device 126. The timing data may indicate the length of time that the parcel 127 is to be monitored within the ROI 105. At block 404, a monitoring setting may be generated for the sensor. For example, the analysis module 212 may generate the monitoring setting for the sensor 110. The monitoring setting may indicate the length of time that the parcel 127 is to be monitored within the ROI 105.

At block 406 first image data may be received from a sensor. For example, the identity classification module 210 and the analysis module 212 may receive image data from the sensor 110. The image data may indicate that the third-party person 133 placed the parcel 127 within ROI 105. The image data may also indicate a time that the third-party person 133 placed the parcel 127 within the ROI 105. The image data may include at least one of images representative of the evaluation field 109 or video representative of the evaluation field 109.

In some embodiments, the identity classification module 210 may determine, based on the image data, that the delivery vehicle 131 has entered the evaluation field 109. The identity classification module 210 may access the database 204 containing data associated with features of known delivery vehicles. In addition, the identity classification module 210 may determine, based on a comparison between the data associated with features of known delivery vehicles and the first image data, that the delivery vehicle is associated with the third-party. Further, the identity classification module 210 may determine that the third-party person 133 that placed the parcel 127 within the ROI 105 is associated with the third-party based on the delivery vehicle 131 being associated with the third-party.

At block 408, a monitoring message including the monitoring setting may be transmitted to the sensor. For example, the analysis module 212 may transmit the monitoring message including the monitoring setting to the sensor 110. The monitoring setting may cause the sensor 110 to monitor the parcel 127 for the length of time that the parcel 127 is to be monitored within the ROI 105.

At block 410, it may be determined whether the parcel is still in the evaluation field. For example, the analysis module 212 may determine whether additional image data indicating that the parcel 127 has been removed from the ROI 105 has been received from the sensor 110. If the parcel 127 is still within the ROI 105, block 410 may be followed by block 412. If the parcel 127 is no longer within the ROI 105, block 410 may be followed by block 422.

At block 412, it may be determined whether the length of time has elapsed. For example, the analysis module 212 may compare an amount of time since the parcel 127 was placed in the ROI 105 to the length of time that that parcel 127 is insured. If the length of time has elapsed, block 412 may be followed by block 414. If the length of time has not expired, block 412 may be followed by block 410 and the method 400 may repeat blocks 410 and 412 until the parcel 127 is removed from the ROI 105 or the length of time elapses.

At block 414, another message may be transmitted to a user device. For example, the analysis module 212 may transmit the another message to the computing device 108. The another message may indicate that the parcel 127 is still located within the ROI 105 and that the length of time that the parcel 127 is to be monitored has elapsed. The message may also indicate that the length of time that the parcel 127 is to be monitored can be extended via payment of money to a third-party associated with the third-party computing device 126.

At block 416, it may be determined whether the user extended the length of time. For example, the analysis module 212 may determine whether user input has been received indicating that the length of time is to be extended. If the length of time has not been extended, block 416 may be followed by block 418. If the length of time has been extended, block 416 may be followed by block 410 and the method 400 may repeat blocks 410, 412, 414, and 416 until the parcel is removed from the ROI 105 or the length of time elapses and is not extended by the user 120.

At block 418, the sensor may be triggered to capture second image data. For example, the analysis module 212 may trigger the sensor 110 to capture the second image data indicating that the parcel 127 is still within the ROI 105. At block 420, a message may be transmitted to the third-party computing device. For example, the analysis module 212 may transmit the message to the third-party computing device 126 indicating that the parcel 127 is still within the ROI 105.

At block 422, second image data may be received from the sensor. For example, the analysis module 212 and the identity classification module 210 may receive the second image data from the sensor 110. The second image data may indicate that the parcel 127 has been removed from the ROI 105 within the length of time that the parcel 127. In some embodiments, the analysis module 212 may determine, based on the second image data, whether the parcel 127 was removed from the ROI 105 and taken inside the building 101 or outside the building 101.

At block 424, it may be determined whether the person that removed the parcel is a known person or an unknown person. For example, the identity classification module 210 may determine, based on the second image data, that the parcel 127 has been removed from the 105 by a human. In addition, the identity classification module 210 may access the database 204 including the known persons library 216. Further, the identity classification module 210 may determine, based on a comparison between the data in the known persons library 216 and the second image data, whether the human is the user 120 or an unknown person. If the person is the user 120, block 424 may be followed by block 426. If the person is an unknown person, block 424 may be followed by block 426.

At block 426, a collection message may be transmitted to the third-party computing device. For example, the identity classification module 210 may transmit the collection message to the third-party computing device 126. The collection message may indicate that the user 120 removed the parcel 127 from the ROI 105. In some embodiments, the collection message may include the second image data.

At block 428, an unknown person message may be transmitted to the third-party computing device. For example, the identity classification module 210 may transmit the unknown person message to the third-party computing device 126. The unknown person message may indicate the time that the unknown person removed the parcel 127 from the ROI 105. In addition, the unknown person message may include the second image data.

The method 400 may also include receiving a dispute message from the third-party computing device. The dispute message may request the second image data. The method 400 may also include transmitting the second image data to the third-party computing device 126 based on the dispute message.

FIG. 5 illustrates a flowchart of another example method 500 to monitor a parcel. The method 500 may be performed by any suitable system, apparatus, or device with respect to monitoring the parcel. For example, the security and automation system 100 of FIG. 1 or the security module 208 of FIG. 2 may perform or direct performance of one or more of the operations associated with the method 500. The method 500 may include one or more blocks 502, 504, 506, 508, 510, 512, 514, or 516. Although illustrated with discrete blocks, the steps and operations associated with one or more of the blocks of the method 500 may be divided into additional blocks, combined into fewer blocks, or eliminated, depending on the particular implementation.

At block 502, timing data may be obtained from a third-party computing device. For example, the analysis module 212 may obtain the timing data from the third-party computing device 126. The timing data may indicate the length of time that the parcel 127 is to be monitored within the ROI 105. At block 504, a monitoring setting may be generated for the sensor. For example, the analysis module 212 may generate the monitoring setting for the sensor 110. The monitoring setting may indicate the length of time that the parcel 127 is to be monitored within the ROI 105.

At block 506 image data may be received from a sensor. For example, the identity classification module 210 and the analysis module 212 may receive the image data from the sensor 110. The image data may indicate that the third-party person 133 placed the parcel 127 within ROI 105. The image data may also indicate a time that the third-party person 133 placed the parcel 127 within the ROI 105. The image data may include at least one of images representative of the evaluation field 109 or a video representative of the evaluation field 109.

In some embodiments, the identity classification module 210 may determine, based on the image data, that the delivery vehicle 131 has entered the evaluation field 109. The identity classification module 210 may access the database 204 containing data associated with features of known delivery vehicles. In addition, the identity classification module 210 may determine, based on a comparison between the data associated with features of known delivery vehicles and the image data, that the delivery vehicle 131 is associated with the third-party. Further, the identity classification module 210 may determine that the third-party person 133 that placed the parcel 127 within the ROI 105 is associated with the third-party based on the delivery vehicle 131 being associated with the third-party.

At block 508, a monitoring message including the monitoring setting may be transmitted to the sensor. For example, the analysis module 212 may transmit the monitoring message including the monitoring setting to the sensor 110. The monitoring setting may cause the sensor 110 to monitor the parcel 127 for the length of time that the parcel 127 is to be monitored within the ROI 105.

At block 510, a message may be transmitted to a user device. For example, the analysis module 212 may transmit the message to the computing device 108. The message may indicate that the parcel 127 was placed within the ROI 105 by the third-party person 133. The message may also indicate that the user 120 can authorize a known person to remove the parcel 127 from the ROI 105 (e.g., the third-party person 133 as a known person).

At block 512, user input may be received. For example, the analysis module 212 may receive the user input. The user input may indicate an identity of a particular known person that is authorized to remove the parcel 127 from the ROI 105. The user input may also indicate an amount of money the particular known person is to receive when removing the parcel 127 from the ROI 105.

At block 514, a code message may be transmitted to a user-device of the particular known person. For example, the analysis module 212 may transmit the code message to the user-device of the third-party person 133. The code message may indicate an authorization code that the particular known person is to provide when removing the parcel 127 from the ROI 105 to confirm the identity of the particular known person.

At block 516, responsive to the particular known person removing the parcel from the evaluation field, transmitting a compensation message to the third-party computing device. For example, the analysis module 212, responsive to the third-party person 133 removing the parcel 127 from the ROI 105, may transmit the compensation message to the third-party computing device 126. The compensation message may indicate that the third-party person 133 removed the parcel 127. In addition, the compensation message may indicate the amount of money the third-party person 133 person is to receive.

FIG. 6 illustrates a flowchart of an example method 600 to determine a risk score for delivery of a parcel. The method 600 may be performed by any suitable system, apparatus, or device with respect to determining the risk score. For example, the security and automation system 100 of FIG. 1 or the factor module 214 of FIG. 2 may perform or direct performance of one or more of the operations associated with the method 600. The method 600 may include one or more blocks 602, 604, 606, or 608. Although illustrated with discrete blocks, the steps and operations associated with one or more of the blocks of the method 600 may be divided into additional blocks, combined into fewer blocks, or eliminated, depending on the particular implementation.

At block 602, neighborhood data may be received from a third-party computing device. For example, the factor module 214 may receive the neighborhood data from the third-party computing device 126. The neighborhood data may indicate a risk factor corresponding to a neighborhood of the building 101. The neighborhood data may also indicate at least one of a theft trend in the neighborhood, an address of the building 101, neighborhood statistics, regional statistics, or a number of humans associated with the building 101.

At block 604, parcel data indicating a factor corresponding to the parcel may be received. For example, the factor module 214 may receive the parcel data from the third-party computing device 126. The factor corresponding to the parcel 127 may indicate at least one of a dimension of the parcel 127, a value of a content of the parcel 127, a number of packages forming the parcel 127, a day and time that the parcel 127 is expected to be placed within the ROI 105, or a perishable state of the content of the parcel 127.

At block 606 image data may be received from a sensor. For example, the factor module 214 may receive the image data from the sensor 110. The image data may be representative of the environment 107 of the building 101. The image data may indicate at least one of a visibility of the ROI 105 from a public space, a number of humans that travel within the evaluation field 109, a number of known persons currently within the evaluation field 109, a number of unknown persons currently within the evaluation field 109, or an environmental state of the environment 107. The environmental state of the environment 107 may indicate at least one of a temperature, a moisture level, weather, or a shade level of the evaluation field 109. The public space may include a sidewalk, a street, or other public space or thoroughfare.

At block 608, the risk score for delivery of the parcel may be determined based on the environment of the building, the risk factor, or the factor corresponding to the parcel. For example, the factor module 214 may determine the risk score for delivery of the parcel 127 based on the environment 107, the risk factor, or the factor corresponding to the parcel 127. In some embodiments, the factor module 214 may determine the risk score for a specific delivery day and time. In other embodiments, the factor module 214 may determine the risk score generally for the user 120.

The method 600 may further include determining an occupancy probability of the building based on at least one of the image data or the risk factor. For example, the factor module 214 may determine the occupancy probability of the building 101 based on at least one of the image data or the risk factor.

The method 600 may further include determining a location of the user 120 corresponding to the parcel 127. In addition, the method 600 may include determining a travel time for the user 120 to travel from the location to the ROI 105 and remove the parcel 127 from the ROI 105. The risk score for delivery of the parcel 127 may be further based on the travel time.

The method 600 further include determining a window of time after delivery in which a majority of parcel thefts occur in the neighborhood. The method 600 may also include determining an average pickup time of the user 120 corresponding to the parcel 127. In addition, the method 600 may include transmitting a message to the computing device 108. The message may indicate the window after delivery in which the majority of parcel thefts occurs and the average pickup time of the user 120.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. These features and advantages of the embodiments will become more fully apparent from the following description and appended claims or may be learned by the practice of embodiments as set forth hereinafter.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, or micro-code) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules to emphasize their implementation independence more particularly. For example, a module may be implemented as a hardware circuit comprising custom very large scale integrated ("VLSI") circuits or gate arrays, off-the-shelf semiconductor circuits such as logic chips, transistors, or other discrete components. A module may also be implemented in programmable hardware devices such as an FPGA, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a server, cloud storage (which may include one or more services in the same or separate locations), a hard disk, a solid state drive ("SSD"), an SD card, a random access memory ("RAM"), a read-only memory ("ROM"), an erasable programmable read-only memory ("EPROM" or Flash memory), a static random access memory ("SRAM"), a Blu-ray disk, a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a personal area network, a wireless mesh network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages.

The computer readable program instructions may execute entirely on the user's computer, partly on the user's computer, as a stand-alone software package, partly on the user's computer and partly on a remote computing device 125 or service or entirely on the remote computing device 125 or server or set of servers. In the latter scenario, the remote computing device 125 may be connected to the user's computer through any type of network, including the network types previously listed. Alternatively, the connection may be made to an external computer (for example, through the Internet using an Internet Service Provider). In some embodiments, electronic circuitry including, for example, programmable logic circuitry, FPGA, or programmable logic arrays ("PLA") may execute the computer readable program instructions by utilizing state information of the computer readable program instructions to personalize the electronic circuitry to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical functions.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Means for performing the steps described herein, in various embodiments, may include one or more of a network interface, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing the steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method to authorize a user for a subscription service, at least a portion of the method being performed by a computing device comprising one or more processors, the method comprising:

receiving input data at a parcel application associated with an environment, the input data comprising a confirmation message, from a third-party retailer, indicating a sensor was purchased from the third-party retailer and indicating an identity of a user that purchased the sensor;

receiving, at the parcel application, additional input data comprising a verification message requesting authorization to install the sensor within the environment, the verification message indicating an identity of a user that is requesting authorization to install the sensor;

extracting, by the parcel application, confirmation message user identification data from the confirmation message and verification message user identification data from the verification message;

parsing the confirmation message user identification data and the verification message user identification data to determine if the identity of the user associated with the confirmation message and the identity of the user associated with the verification message both correspond to the user; and responsive to the confirmation message user identification data and the verification message user identification data both corresponding to the user, automatically authorizing the user to install the sensor and authorizing the user for the subscription service provided by the third-party retailer by transmitting, by the parcel application associated with the environment, output data to the third-party retailer to initiate and/or update a user account for the user, wherein the automatic authorization enables the sensor to integrate with a security subsystem of an automation system within the environment to monitor a region of interest (ROI) in an evaluation field of the sensor and perform response actions based on objects detected in the ROI.

2. The method of claim 1, wherein the sensor comprises a doorbell comprising an image sensor.

3. The method of claim 1, wherein:

the confirmation message also indicates a purchase date of the sensor from the third-party retailer;

the method further comprises:

determining an installation date of the sensor based on the verification message; and determining an amount of time between the purchase date and the installation date; and the automatically authorizing the user for the subscription service provided by the third-party retailer is further responsive to the amount of time between the purchase date and the installation date being equal to or less than a threshold value.

4. The method of claim 1, wherein the sensor comprises a depth sensor.

5. The method of claim 4, wherein the depth sensor comprises at least one of a radio detection and ranging (RADAR) sensor, a time of flight (ToF) sensor, or a light detection and ranging (LiDAR) sensor.

6. The method of claim 1, wherein the sensor comprises an audio sensor.

7. The method of claim 6, wherein the audio sensor comprises a microphone.

8. A system comprising:

a processor;

memory in communication with the processor; and instructions stored in the memory, the instructions executable by the processor to:

receive input data at a parcel application associated with an environment, the input data comprising a confirmation message indicating a sensor was purchased from a third-party retailer and indicating an identity of a user that purchased the sensor;

receive, at the parcel application, additional input data comprising a verification message requesting authorization to install the sensor within the environment, the verification message indicating an identity of a user that is requesting authorization to install the sensor;

extract, by the parcel application, confirmation message user identification data from the confirmation message and verification message user identification data from the verification message;

parse the confirmation message user identification data and the verification message user identification data to determine if the identity of the user associated with the confirmation message and the identity of the user associated with the verification message both correspond to the user; and responsive to the confirmation message user identification data and the verification message user identification data both corresponding to the user, automatically authorize the user to install the sensor and authorize the user for a subscription service provided by the third-party retailer by transmitting, by the parcel application associated with the environment, output data to the third-party retailer to initiate and/or update a user account for the user, wherein the automatic authorization enables the sensor to integrate with a security subsystem of an automation system within the environment to monitor a region of interest (ROI) in an evaluation field of the sensor and perform response actions based on objects detected in the ROI.

9. The system of claim 8, wherein the sensor comprises a doorbell comprising an image sensor.

10. The system of claim 8, wherein:

the confirmation message also indicates a purchase date of the sensor from the third-party retailer;

the instructions executable by the processor to further:

determine an installation date of the sensor based on the verification message; and determine an amount of time between the purchase date and the installation date; and the automatic authorization of the user for the subscription service provided by the third-party retailer is further responsive to the amount of time between the purchase date and the installation date being equal to or less than a threshold value.

11. The system of claim 8, wherein the sensor comprises a depth sensor.

12. The system of claim 11, wherein the depth sensor comprises at least one of a radio detection and ranging (RADAR) sensor, a time of flight (ToF) sensor, or a light detection and ranging (LiDAR) sensor.

13. The system of claim 8, wherein the sensor comprises an audio sensor.

14. The system of claim 13, wherein the audio sensor comprises a microphone.

15. A method comprising:

receiving input data at a parcel application associated with an environment, the input data comprising a confirmation message, from a third-party retailer, indicating a sensor was purchased from the third-party retailer and indicating an identity of a user that purchased the sensor;

receiving, at the parcel application, additional input data comprising a verification message requesting authorization to install the sensor within the environment, the verification message indicating an identity of a user that is requesting authorization to install the sensor;

extracting, by the parcel application, confirmation message user identification data from the confirmation message and verification message user identification data from the verification message;

parsing the confirmation message user identification data and the verification message user identification data to determine if the identity of the user associated with the confirmation message and the identity of the user associated with the verification message both correspond to the user; and responsive to the confirmation message user identification data and the verification message user identification data both corresponding to the user, automatically authorizing the user to install the sensor and authorizing the user for a subscription service provided by the third-party retailer by transmitting, by the parcel application associated with the environment, output data to the third-party retailer to initiate and/or update a user account for the user, wherein the automatic authorization of the user enables the sensor to integrate with a security subsystem of an automation system within the environment to monitor a region of interest (ROI) in an evaluation field of the sensor and perform response actions based on objects detected in the ROI.

16. The method of claim 15, wherein the sensor comprises a doorbell comprising an image sensor.

17. The method of claim 15, wherein:

the confirmation message also indicates a purchase date of the sensor from the third-party retailer;

the method further comprising:

determining an installation date of the sensor based on the verification message; and determining an amount of time between the purchase date and the installation date; and the automatically authorizing of the user for the subscription service provided by the third-party retailer is further responsive to the amount of time between the purchase date and the installation date being equal to or less than a threshold value.

18. The method of claim 15, wherein the sensor comprises a depth sensor.

19. The method of claim 18, wherein the depth sensor comprises at least one of a radio detection and ranging (RADAR) sensor, a time of flight (ToF) sensor, or a light detection and ranging (LiDAR) sensor.

20. The method of claim 15, wherein the sensor comprises an audio sensor.

\* \* \* \* \*